No. 742,947. PATENTED NOV. 3, 1903.
C. C. WORTHINGTON.
WATER METER.
APPLICATION FILED AUG. 23, 1900. RENEWED APR. 8, 1903.
NO MODEL. 2 SHEETS—SHEET 1.
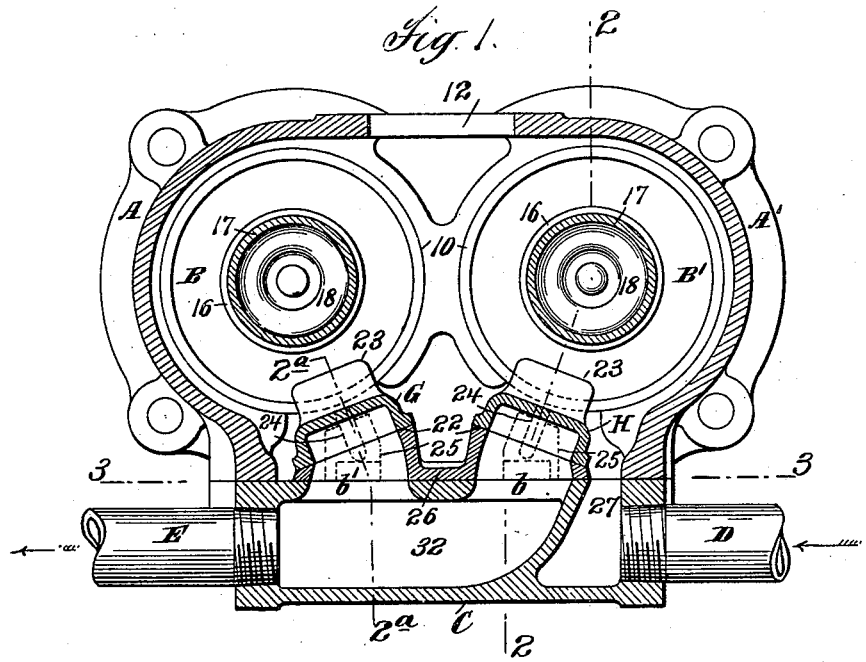
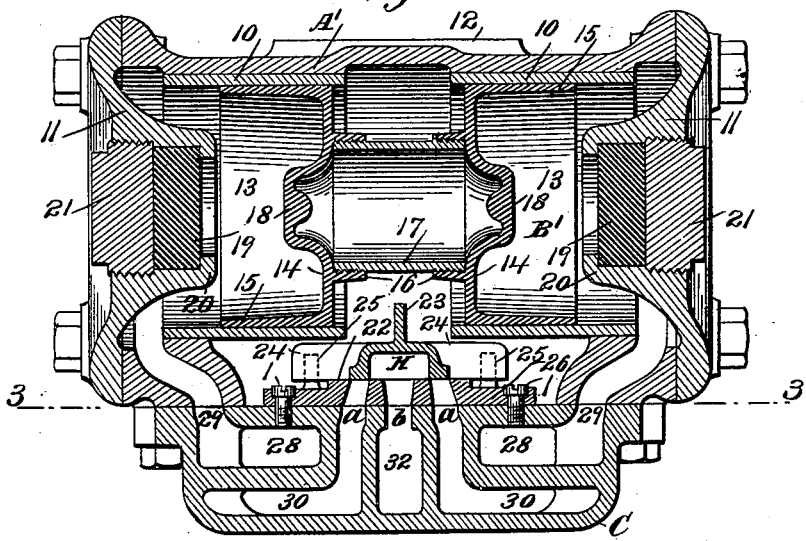
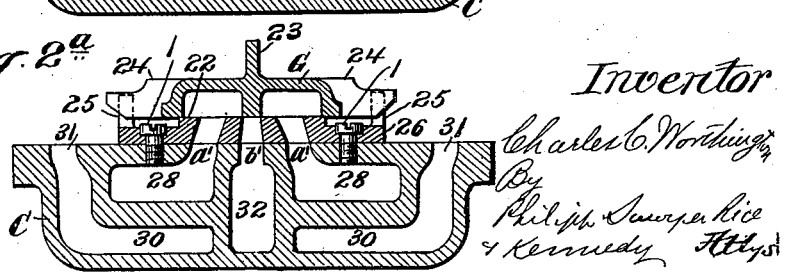

No. 742,947. PATENTED NOV. 3, 1903.
C. C. WORTHINGTON.
WATER METER.
APPLICATION FILED AUG. 23, 1900. RENEWED APR. 8, 1903.
NO MODEL. 2 SHEETS—SHEET 2.
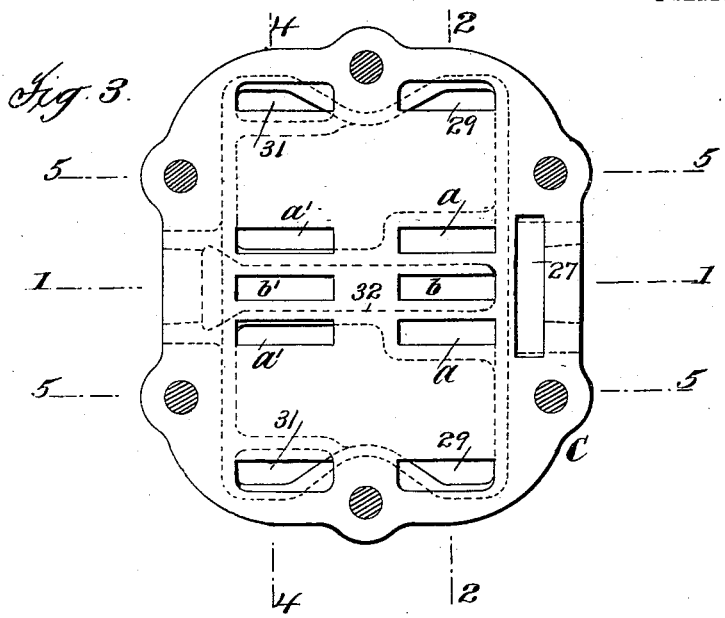
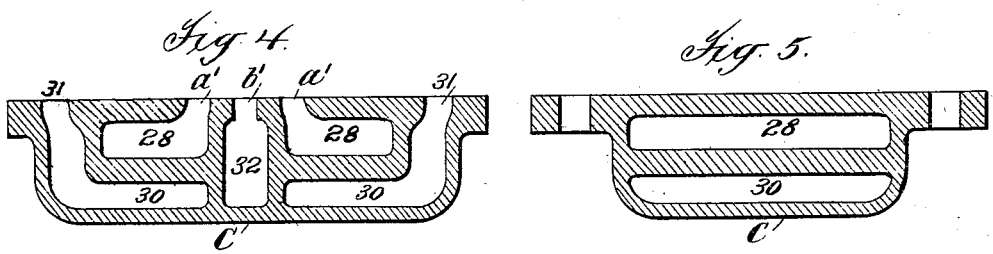
Attest:
J. A. Graves.
A. H. V. Bourke.
Inventor:
Charles C. Worthington
By Philipp Sawyer Rice
& Kennedy
Att'ys No. 742,947.

Patented November 3, 1903.

UNITED STATES PATENT OFFICE.

CHARLES C. WORTHINGTON, OF DUNNFIELD, NEW JERSEY.

WATER-METER.

SPECIFICATION forming part of Letters Patent No. 742,947, dated November 3, 1903.

Application filed August 23, 1900. Renewed April 8, 1903. Serial No. 151,682. (No model.)

*To all whom it may concern:*

Be it known that I, CHARLES C. WORTHINGTON, a citizen of the United States, residing at Dunnfield, county of Warren, and State of New Jersey, have invented certain new and useful Improvements in Water-Meters and Similar Apparatus, fully described and represented in the following specification and the accompanying drawings, forming a part of the same.

This invention relates generally to that class of meters for measuring the quantity of flowing liquids which are known in the art as "piston-meters," but more particularly to a meter having the general characteristics of the meter shown and described in Letters Patent No. 13,320, dated July 24, 1855, and No. 338,972, dated March 30, 1886, consisting of two cylinders which are provided with double-acting plungers and with induction and discharge ports, which are so arranged that the induction and discharge valves of each cylinder are operated by the plunger of the other, thereby causing the movement of each plunger to be controlled by the other, as fully described in the Letters Patent above referred to.

The object of the present invention is to improve the construction of such liquid-meters; and the invention relates especially to a novel construction of valves and valve-chambers by which the size and weight of the valve-chamber may be reduced and the valve-seats and valves freed from foreign matter more readily than in liquid-meters as heretofore constructed.

The invention includes also a plunger construction by which the length of the meter may be reduced and the desired strength and lightness of construction secured.

For a full understanding of the invention a detailed description of a construction embodying all the features of the invention as applied in their preferred form in connection with a liquid-meter of the particular class above referred to will now be given in connection with the accompanying drawings, forming a part of this specification, and the features forming the invention will then be specifically pointed out in the claims.

In the drawings, Figure 1 is a central cross-section of the meter. Fig. 2 is a longitudinal vertical section on the line 2 of Figs. 1 and 3. Fig. 2ª is a similar partial section taken on line 2ª of Fig. 1. Fig. 3 is a horizontal section or plan of the valve-chamber on the line 3 of Figs. 1 and 2. Fig. 4 is a longitudinal section on the line 4 of Fig. 3. Fig. 5 is a cross-section on either of the lines 5 of Fig. 3.

Referring to said drawings, the general arrangement and operation of the meter are the same as fully described in Letters Patent No. 338,972, the meter consisting of the two cylinders A A', forming the top of the meter, and the valve-chamber C, forming the base of the meter and containing the ports and passages which lead from the valves to and from the opposite ends of the cylinders, induction-pipe D communicating with this base of the meter at one side and discharge-pipe E at the opposite side centrally of the meter lengthwise. The cylinders A A' are provided with packing-rings 10, through which the plungers B B' reciprocate and which, together with the plungers, form the four chambers at the ends of the cylinders. The cylinders are shown as provided at their opposite ends with removable heads 11, and the body portion of the meter has the usual central top opening 12 for the shaft of the registering mechanism. The plungers B B' are preferably of the form shown clearly in Fig. 2, being hollow and open at their ends, so that the length of the central portion of the plungers is largely reduced below that of the closed plungers heretofore used. These plungers are formed of the two end shells 13, having the central disks 14 and flanges 15, which flanges move in the packing-rings 10, and the disks 14 are provided with the projecting screw-flanges 16, by which the two ends are connected together by screw-sleeve 17 to form the plungers. The disks 14 are provided with central bumpers 18, which engage inwardly-projecting buffers 19 on heads 11, which are preferably rubber or other elastic buffers, held between narrow flanges on inwardly-projecting central portions 20 on heads 11, the buffers 19 being held in place by screw-plugs 21. The flanges 15 thus enter the circumferential spaces about the inwardly-projecting portions 20 of heads 11 at the end of the movement of the plungers, the desirable long bearing of the flanges and packing-rings 10 thus being secured with a short meter construction.

Below the plungers B B' are the valves G H; but these valves instead of moving on horizontal seats and being arranged directly under the plungers, as heretofore, are set somewhat inside the central line of the plungers, and the desired valve capacity is secured with the horizontal width of the valve-chamber diminished by inclining the valves and their seats 22, as shown in Fig. 1, the highest parts of the inclined seats being adjacent and the seats and valves sloping downward and outward toward the opposite sides of the meter. The size of the base portion of the meter is thus reduced, and the incline aids also in keeping the seats and faces of the valves free from any foreign material that may be carried in the water and liable to deposit on the seats. These valves G H are shown as of substantially the same construction and operated by the plungers B B' in the same manner as in Patent No. 338,972, above referred to, except that valve G is a D-valve and the other valve H is a B-valve, the valve and port arrangement therefore being such that the ports do not cross each other, as in the Patent No. 338,972; but the cross-motion takes place in the valves, which provides for a simpler meter-bottom and enables it to be made shallower, while securing a large capacity. Any increase in depth resulting from the inclining of the valves is thus compensated for. The valves G H have the usual upwardly-projecting operating-flanges 23, by which the valves are moved in opposite directions by the plungers B B', and are shown as provided with guiding-ribs 24, moving between fixed guides 25 on the valve-seat casting 26, which casting is shown as formed separately from the base-casting C and secured thereto by screws 1, although it will be understood that these parts may be constructed in any other suitable manner.

The port construction of the casting C is as follows: The valve-seats 22 are provided with induction-ports $a\ a'$ and discharge-ports $b\ b'$ for the respective cylinders A A', these ports for each cylinder being controlled by the corresponding valve actuated by the plunger on the opposite cylinder. These ports $a\ a'$ and $b\ b'$ connect with the induction and discharge pipes D E and the cylinders through passages in the base-casting C, as follows: The induction-pipe D communicates through passage 27, which is at the side of the meter and centrally of the meter lengthwise, with the central chamber of the meter common to the two plungers B B' and between the packings 10. This central chamber communicates with the induction and discharge ports $a\ a'$ and $b\ b'$ through the valves G H. Ports $a'$ for cylinder A', which ports are on the A cylinder side of the meter and controlled by valve G, actuated by the plunger B, connect with the chambers at the opposite ends of the plunger B' through horizontal passages 28 in the base C and vertical passages 29 in the base and cylinder castings, and the ports $a$ for cylinder A, which ports are on the A cylinder side of the meter and controlled by valve H, actuated by plunger B', communicate with the chambers at the opposite ends of the plunger B by passages 30 in base-casting C and vertical passages 31 in the base and cylinder castings. The passages 28 30, running across the base-casting C, are arranged with the passages 28 above the passages 30, these passages being wide and shallow, so that the base-casting is correspondingly shallow, this being permitted by the fact that the passages for the opposite ends of each cylinder do not cross each other. The discharge-port $b'$ for cylinder A', which port also is on the A cylinder side of the engine and controlled by valve G, communicates with the discharge-pipe E through discharge-passage 32, running across the center of the base-casting C between the passages 28 30, and the discharge-port $b$ for cylinder A, which port is on the A' cylinder side of the engine and controlled by valve G, communicates with the same discharge-passage 32.

It will be understood that modifications in the construction shown may be made without departing from the invention, and I am not to be limited to the exact form or arrangement of parts illustrated. The feature of inclined valve-seats and valves is applicable generally in meters and similar apparatus having two cylinders arranged side by side and is thus claimed.

What I claim is—

1. The combination with two cylinders arranged side by side, of valves arranged to move longitudinally of the cylinders and valve-seats arranged side by side and on opposite sides of a plane central between the cylinders, and inclined transversely to the cylinders, substantially as described.

2. The combination with the two cylinders A, A' and their plungers B, B', of the base portion having valve-seats 22 inclined transversely to the cylinders, and valves on said seats arranged to move longitudinally of the cylinders, substantially as described.

3. The combination with the two cylinders A, A' and their plungers B, B', of the base portion having the valve-seats 22 arranged opposite the space between the plungers and inclined downward and outward in opposite directions transversely to the cylinders, and valves on said seats, substantially as described.

4. The combination with the two cylinders A, A' and their plungers B, B', of the base portion having valve-seats 22 inclined transversely to the cylinders, and valves on said seats, one of said valves being a B-valve and the other a D-valve, and admission-ports to the opposite ends of said cylinders controlled by said valves, substantially as described.

5. A plunger formed of the head-shells 13 having projecting rim-flanges 15 and central flanges 16, of central sleeve 17 secured to said flanges and connecting the shells, substantially as described.

In testimony whereof I have hereunto set my hand in the presence of two subscribing witnesses.

CHARLES C. WORTHINGTON.

Witnesses:
C. J. SAWYER,
A. A. V. BOURKE.